Jan. 23, 1951          J. B. HOYE          2,539,368
ADJUSTABLE REGISTER WHEEL
Filed Dec. 27, 1948                    2 Sheets-Sheet 1

Inventor
JAMES B. HOYE

By Lindsey, Prutzman & Just
Attorneys

Jan. 23, 1951  J. B. HOYE  2,539,368
ADJUSTABLE REGISTER WHEEL
Filed Dec. 27, 1948  2 Sheets-Sheet 2
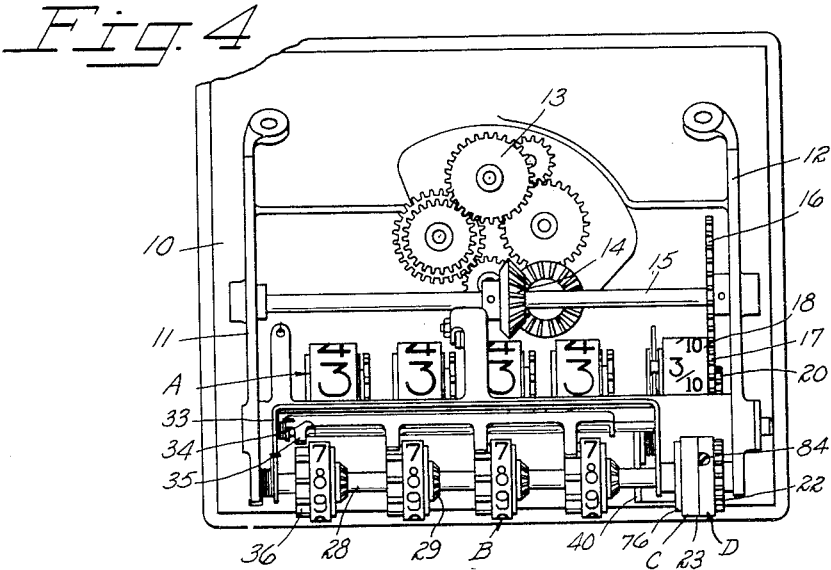
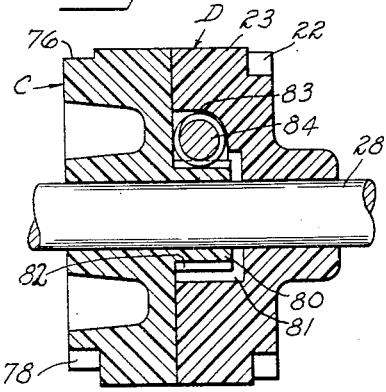
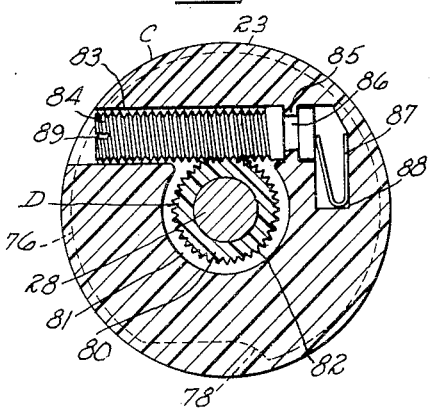
Inventor
JAMES B. HOYE
By Lindsey, Prutzman & Just
Attorneys Patented Jan. 23, 1951

2,539,368

UNITED STATES PATENT OFFICE 2,539,368

ADJUSTABLE REGISTER WHEEL

James B. Hoye, Hartford, Conn., assignor to Veeder-Root Incorporated, Hartford, Conn., a corporation of Connecticut Application December 27, 1948, Serial No. 67,451

5 Claims. (Cl. 235—1)

1

The present invention relates to registering or counting apparatus, and has particular utility in connection with counters or registers of the predeterminator type. More particularly, the present invention relates to an adjustable wheel construction having relatively movable and settable parts which may be precisely and conveniently adjusted in angular relationship to each other.

In the specific application of the adjustable wheel construction of my invention disclosed herein, one portion of the wheel is provided with actuating means adapted to function an associated apparatus at a rotated position thereof while a second concentric portion of the wheel is arranged to be driven rotatably during operation of the register. The utility of having the first-named portion angularly adjustable with respect to the second portion is that the actuation of the associated apparatus may be selectively adjusted to occur at any predetermined rotated position of the driven portion of the wheel.

It is an object of the present invention to provide such an adjustable wheel which is of simple construction and which may be easily and readily fabricated and assembled at relatively low cost.

A further object of the invention is to provide such an adjustable wheel construction in which the means for setting is readily accessible and easily operable whereby adjustment of the wheel is facilitated.

Another object of the invention is to provide an adjustable wheel construction wherein the relative setting of the movable parts with respect to each other is subject to infinite variation over a wide range whereby a precise and accurate setting of the wheel may be assured.

A further object of the present invention is to provide such an adjustable wheel construction which can be set with precision and accuracy and wherein, despite the ease and range of adjustment, the setting is permanent, that is, it will not readily come out of adjustment during operation of the device and will be subject to change only by the operator.

A further object of the invention is to provide an adjustable wheel which is of rugged construction and which will provide long periods of satisfactory service.

Other objects will be in part obvious and in part pointed out more in detail hereinafter.

The invention accordingly consists in the features of construction, combination of elements and arrangement of parts which will be exemplified in the construction hereafter set forth and

2 the scope of the application of which will be indicated in the appended claims.

In the drawings—

Fig. 4 is a top view of the register;

Fig. 5 is a transverse cross sectional view of the adjustable wheel construction of the present invention which in the embodiment shown is a non-indicating counterwheel unit of lowest order of the predetermining counter;

Fig. 6 is a cross sectional view of the same wheel taken at a right angle to that of Fig. 5; and Fig. 7 is a cross sectional view of the counterwheel unit of lowest order of the registering counter.

In order to demonstrate the utility of the present invention and by way of background to facilitate the understanding of the invention, the same will be described in connection with the predeterminator register disclosed and claimed in the copending application of Harvey N. Bliss, Serial No. 712,575, filed November 27, 1946, now Patent No. 2,524,755 of October 10, 1950.

Figure 1:
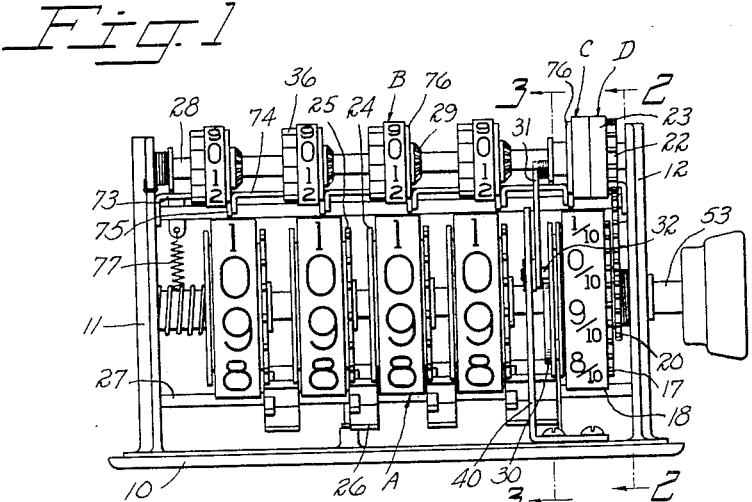
Figure 1 is a front view of a predeterminator register incorporating the adjustable wheel construction of the present invention.

Referring to the drawings, and particularly Figs. 1 and 4, there is shown a predeterminator register mounted on a frame comprising a base plate 10 and side plates 11 and 12. The register is adapted to be driven, for example, by a meter (not shown in the drawings) which is operatively connected to the register through the gear train 13 positioned in the rear of the device. The gear train culminates in a bevel gear 14 fixed on a shaft 15 rotatably mounted on the side plates 11 and 12.

Figure 2:
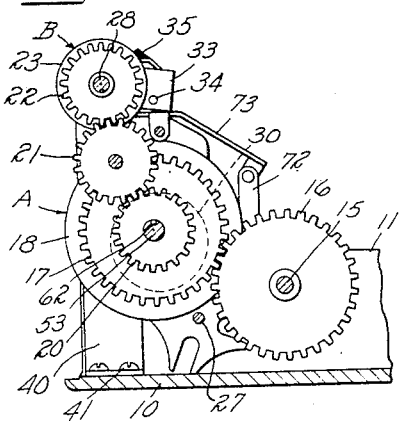
Fig. 2 is a cross sectional view taken along the line 2—2 of Fig. 1.

As best shown in Fig. 2, the shaft 15 has a spur gear 16 fixed at one end thereto which is in mesh with a driven gear 17 fixed to the first counterwheel unit 18 of the registering counter A, which unit 18 is shown in detail in Fig. 7. The first counterwheel unit 18 also has fixed thereto a second gear 20 which, through idler gear 21, drives a gear 22 fixed to the first wheel unit 23 of the predetermining counter B. The first wheel unit 23 is the adjustable wheel of the present invention and its function is to provide adjustable means for initiating or operating the shut-off of an associated apparatus such as a fluid valve or pump (not shown). In the embodiment shown, the wheel unit 23 is not provided with indicia and is not arranged to be viewed. However, this is a mere matter of choice.

The counterwheel units (shown five) of the registering counter A hereinafter referred to as the "registering counterwheel units" are arranged in progressive order, the first unit 18 being adapted to register tenths, the second to register units, etc. The first registering counterwheel unit has indicia comprising "0/10" to "9/10," while indicia comprising the figures "0" to "9" are provided in the usual manner on the peripheries of the remaining wheel units to register with windows in the casing (not shown) whereby the setting of the wheels may be observed and read. Each of these counterwheel units is provided with the usual driving and driven gears 24 and 25 adapted to cooperate with the transfer pinions 26 mounted on a transfer pinion shaft 27 extending between the side plates 11 and 12.

The upper set of counterwheel units comprising the predetermining counter B hereinafter referred to as the "predetermining counterwheel units" comprises an equal number of wheel units, including the adjustable wheel unit 23 of the present invention previously referred to. All of the predetermining counterwheel units with the exception of the first unit 23 are provided in the usual manner with indicia ranging from "0" to "9." All of these predetermining counterwheel units are rotatably mounted on a shaft 28 extending between the side plates 11 and 12. In the completely assembled device, means (not shown in the drawings) is provided to engage the bevel gears 29 for presetting each of the wheel units separately for any desired reading, except for the non-indicating unit 23 which is continuously geared to the first registering counterwheel unit 18 and whose setting, therefore, is fixed thereby.

Figure 3:
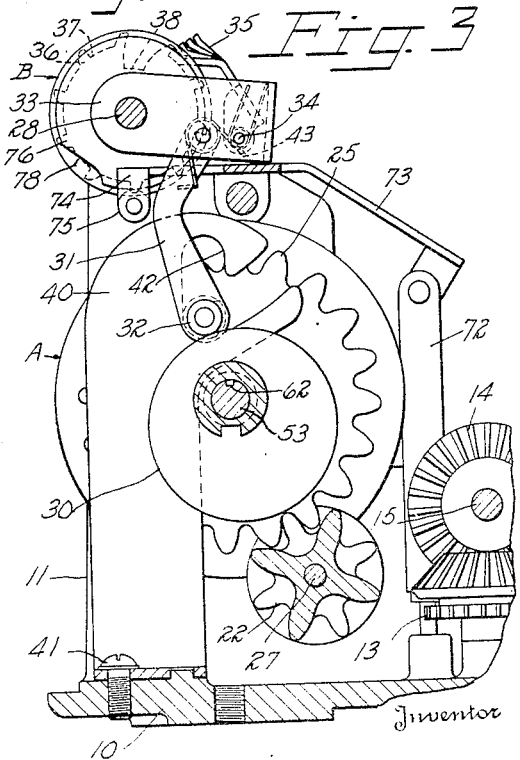
Fig. 3 is a cross sectional view taken along the line 3—3 of Fig. 1.

Each of the predetermining counterwheel units, with the exception of the adjustable wheel unit 23 which is directly geared to the first registering counterwheel unit 18, as described above, is driven by a cam and ratchet arrangement more particularly shown in Fig. 3 of the drawings. As best shown in Fig. 3, a camming disk 30 secured to the registering counterwheel unit 18 and rotatably therewith causes a lever arm 31 to be reciprocated up and down for each turn of the counterwheel unit. The camming disk 30 is so arranged that the lever arm 31 is driven upwardly during the first half of a turn of the wheel unit 18 and permitted to return during the last half of the turn. The lower end of the arm 31 has a roller 32 adapted to rest on the periphery of the cam disk 30 to reduce the friction between the arm and the disk. The upper end of the arm 31 is pivotally connected to a frame member 33 which, in turn, is pivotally mounted on the shaft 28 supporting the predetermining counterwheel units of the predetermining counter B. Accordingly, the frame also is reciprocated up and down by the turning of the counterwheel unit 18.

Pivotally supported on a shaft 34 extending through the pivotal frame member 33 are a plurality of ratchet arms 35 which are adapted, respectively, to engage ratchet wheels 36, one of which is fixed to each of the predetermining counterwheel units. Each of the ratchet wheels 36 is provided with notches 37 corresponding to the indicia on the number wheel, which notches are all of equal size, and a relatively deep notch 38 positioned for engagement with the ratchet arms 35 when that particular counterwheel unit registers zero. The ratchet arms 35 are disposed at relative angles decreasing in amount in sequence such that when one of the ratchet arms 35 is in engagement with a notch 37 of a counterwheel unit of lower order, the remaining ratchet arms 35 cannot engage the notches of the ratchet wheel or wheels of the counterwheel units of higher order. However, when the counterwheel unit of lower order has been regressed to "zero," the notch 38 of that wheel, which then receives the corresponding arm 35, is sufficiently deep to permit the arm 35 for actuating the next counterwheel unit to be displaced into engagement with a notch of the said next counterwheel unit, thus functioning as a transfer device. The notches 38 being formed of sufficient depth so that all ratchet wheels are engaged by the ratchet arms 35 when the notches 38 are aligned, it will be apparent that during the reciprocation of the frame member 33 the turning of the predetermining counterwheel units to zero will be accomplished in a stepwise fashion, i. e., the wheel units are returned and come to rest at zero in sequence beginning with the wheel unit of highest order. As mentioned above, the driving of the predetermining counterwheel units is accomplished during the first half of each turn of the first registering counterwheel unit 18 and remain stationary during the last half of the turn. In other words, a full count is registered by said wheels during substantially one-half count of the counterwheel unit 18 and of the adjustable wheel 23.

The lower end of the lever arm 31 which rests upon the cam disk 30 of the first registering counterwheel unit 18 is positioned by an upright positioning member 40 secured to the base plate 19 of the frame by suitable screws 41. The supporting member 40 has at its upper end a generally L-shaped slot 42 for receiving the flanged roller 32 on the end of the arm 31. The supporting member 40 and the flanged roller 32 are so arranged that the flanges on the roller 32 by engagement with the sides of the slot 42 prevent any sidewise pivoting of the arm 31 thus insuring that the roller 32 will remain in alignment with the cam disk 30. The vertical portion of the L-shaped slot 42 permits the end of the arm 31 to be reciprocated vertically to cause the driving of the predetermining counterwheel units as previously described. As the direction of rotation of the cam disk 30 during registration is counterclockwise, looking at Fig. 3, there will always be a positive engagement between the cam disk 30 and the lever arm 31 during driving because the tendency of the lower end of the arm 31 to move or pivot toward the front of the register (due to friction between the arm 31 and cam disk 30) is effectively controlled by the forward edge of the L-shaped slot 42. This tendency of the lever arm 31 to move or pivot forwardly of the register is increased, moreover, by a spring 43 situated between the arm 31 and the frame member 33. When the cam disk 30 is turned in a reverse or clockwise direction, which occurs when the registering counterwheel units are being reset to zero, the lower end of the lever arm, which will now tend to move or pivot inwardly of the register, rides outwardly in the L-shaped slot 42 and, therefore, will not be reciprocated up and down. In this way, no motion is transmitted to the frame member 33 during resetting of the registering counterwheel units and, consequently, there is no resultant turning of these units and no effect upon the reading shown thereon.

As referred to above, the first registering counterwheel unit 18 is rotated by a driven gear 17 fixed thereto and it, in turn, drives the first predetermined counterwheel unit 23 (the non-indicating adjustable wheel) by a smaller or second gear 20 fixed thereto. The construction of the first registering counterwheel unit 18 is best shown in Fig. 7. Referring to Fig. 7, it will be observed that the counterwheel unit 18 comprises a number wheel 50 having a hub 51 with a relatively small central opening 52 at one end to accommodate the main portion of the resetting shaft 53 on which the registering counterwheel units are rotatably mounted, and an enlarged opening 54 at the other end to slidably accommodate a boss 55 on the resetting shaft 53. Fixed to the hub 51 of the number wheel is the cam disk 30 referred to above, a locking disk 56, and a third disk 57, said disk 57 and locking disk 56 being spaced apart by spacing pins 58 therebetween. A transfer pin (not shown) may be provided on the disk 57 to engage the first transfer pinion 26 to cause it to turn and thus advance the second registering wheel unit one number for each turn of the unit wheel 18. The resetting shaft 53 contains an annular groove 59 for receiving a pawl 60 pivotally mounted in the hub 51 of the number wheel 50 and urged toward the shaft by a spring member 61. When the resetting shaft 53 is pushed inwardly, the pawl 60 rides laterally out of the annular groove 59 and is held on the outer periphery of the shaft 53 unless or until such time as the shaft is rotated to align the longitudinal resetting groove 62 therewith, whereupon the pawl 60 pivots into engagement with the groove 62 and the number wheel 50 becomes, in effect, keyed to the resetting shaft 53 and may be reset thereby to zero.

The driven gear 17 is rotatably positioned on the hub 51 at the end having the enlarged opening 54 and a connection is made between this gear and the number wheel 50 by means of a pressure plate 63 which is slidably keyed to the hub 51 so that it rotates therewith but is longitudinally slidable thereon. The plate 63 is urged laterally into contact with the driven gear 17 by a relatively strong spiral spring 64 extending between the plate 63 and a shoulder 65 on the hub 51 of the number wheel 50. When the resetting shaft 53 is pushed inwardly, as when it is intended to reset the number wheel units, the boss 55 on the shaft 53 engages the pressure plate 63 and moves it laterally inwardly against the pressure of the spiral spring 64, thereby disengaging the number wheel 50 from the driven gear 17 so that the number wheel is free to be reset to zero by turning the reset shaft 53.

Although the resetting shaft 53 is not intended to rotate the number wheel 50 until the pawl 60 is engaged in the longitudinal resetting groove 62, it has been found that there frequently is sufficient friction between hub 51 and/or the pawl 60 and the periphery of the resetting shaft 53 to cause the number wheel 50 to be rotated before the pawl 60 becomes aligned and engaged with the resetting groove 62. This tendency of the number wheel to rotate prematurely has been avoided in accordance with the invention by providing a second pressure plate 66 slidably keyed to the hub 51 so that it is rotatable therewith but slidable longitudinally thereon, which plate is adapted to frictionally engage the driven gear 17 on the face opposite to that engaged by the first pressure plate 63. In the specific embodiment shown, the pressure plate 66 is between the driven gear 17 and the smaller driving gear 20 which is also slidable longitudinally on the hub 51 of the number wheel, this pair of elements (plate 66 and gear 20) being urged toward the driven gear 17 by a spiral spring 67 supported on a flanged collar 68 retained on the hub 51 of the wheel by the retaining ring 69 received in an annular groove 70 in the hub. The frictional engagement of the pressure plates 63 and 66 and the driven gear 17 is faciliated by a pair of friction disks 71 therebetween. The pressure exerted by the spring 67 is relatively weak being just sufficient to overcome the friction referred to above without materially interfering with the resetting operation.

The predeterminator shown in the drawings is adapted to shut off or actuate a shut-off mechanism for an associated apparatus (not shown) through a reciprocal connecting arm 72. The arm 72 is pivotally connected to a pivoted lever arm 73 which is attached at one end to a roller bar 74 comprising a series of rollers 75 adapted to respectively engage cam disks 76 on the predetermining counterwheel units of the predetermining counter B. The pivoted lever arm 73 is biased by a spring 77 so as to force the rollers 75 upwardly against the peripheries of the cam disks 76. Each of these cam disks 76 is provided with a notch 78 for receiving the rollers 75 when the counterwheel units are returned to zero during a dispensing operation. As will be apparent, when all of the notches 78 are in alignment with the rollers 75, the lever arm 73 is permitted to pivot under the influence of the biasing spring 77 thereby lowering the connecting arm 72 which is utilized to shut off the associated apparatus by any suitable connection thereto (not shown). Inasmuch as there is usually a brief time interval (due to inertia, for example) between the instant the notches become aligned and the associated apparatus becomes fully stopped, it has been found necessary to provide a notch 78 in the first predetermining counterwheel unit, i. e., the non-indicating wheel unit 23, which is somewhat in advance of the zero position, whereby the shutting off of the associated apparatus is initiated slightly before the desired quanity has been dispensed and whereby the actual shutting off of the associated apparatus is completed by the time the wheel unit 23 reaches zero position. As the amount of coasting after the shutting off of the associated apparatus has been initiated, but before it is completed, will vary widely in different installations, depending on the type of associated apparatus, the shutting off means utilized, etc., it has been found impossible to select a fixed position of the notch 78 of the wheel unit 23 which in all installations will effectively cause the associated apparatus to become completely shut off at the exact instant when the desired predetermined number of units has been dispensed or counted.

Accordingly, it has been found desirable to construct the counterwheel unit 23 so that the position of the notch 78 is variable with respect to the position of the driven elements of the wheel whereby the same may be adjusted to fit any particular installation. This has been accomplished in accordance with the present invention as shown more particularly in Figs. 5 and 6. Referring to these figures, it will be seen that the counterwheel unit 23 ts formed in two separate section C and D. Section C thereof, which includes the cam surface 76 and a notrh 78 therein for causing actuation of the roller bar, as previously described, is provided with a hub 80 which extends into a recess 81 formed in the second section D of the wheel unit. Section D of the wheel unit, which carried the driven gear 22 previously referred to, is formed with a slot 83 tangential to the periphery of the hub 80 in which is positioned a worm 84 for engaging teeth 82 formed on the hub 80. The worm 84 is positioned in the slot 83 by engagement of shoulder 85 in the slot with an annular groove 86 in the worm. A spring 87 is provided in the recess 88 to exert a longitudinal force upon the worm 84 to effectively overcome any tendency of the worm to turn because of vibration or the like. The end of the worm is formed with a slot 89 for receiving a suitable tool (not shown), such as a screw driver, by means of which the worm can be manually turned. Turning of the worm 84, by reason of its engagement with the toothed hub 80 of section C of the wheel, provides an infinite adjustment between the sections C and D of the wheel unit whereby the notch 78 in the first section C may be positioned at any desired rotated point with respect to the driving mechanism carried by section D of the counterwheel unit. If desired, suitable indicia (not shown) may be provided on the peripheries of the sections C and D adjacent the inner edges to facilitate the relative positioning of the sections by the operator.

It thus will be seen that there has been provided, in accordance with the invention, a compact and effective adjustable wheel which can be precisely set without difficulty or the use of special tools and which gives a range of adjustability and selection greatly enhancing the utility of the wheel particularly in predeterminator register mechanisms of the type referred to.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. An adjustable wheel construction for use in registering and counting devices comprising a pair of wheel sections constructed and arranged to be mounted rotatably and concentrically in side by side relationship, and manually operable means for setting and maintaining the sections in any selected rotated position relative to each other, comprising a series of annularly arranged teeth fixed on one of the sections, and a manually rotatable member rotatably mounted on the other of the sections having a plurality of teeth continuously in mesh with said series of teeth and forming a driving connection therewith.

2. An adjustable wheel unit for use in registering and counting devices comprising a plurality of sections in side by side relationship, a hub extension on one of said sections, means on the second section forming a central opening for receiving said hub extension, a plurality of teeth on said hub extension forming a worm gear, and a worm rotatably and tangentially arranged in the second section engaging said worm gear.

3. An adjustable wheel unit for use in registering and counting devices comprising two side by side sections, a worm having an annular groove at one end, means in one section forming an opening for said worm and having a boss engaging said annular groove, and a series of annularly arranged teeth on the second section in mesh with said worm.

4. An adjustable wheel unit for use in registering and counting devices comprising two side by side sections, a series of annularly arranged teeth on one section, a worm engaging said teeth having an annular groove at one end and turning means at the other end, means in the second section forming a passageway for said worm and including a boss engaging said annular groove, said passageway being extended to the periphery of the section to expose the said turning means of the worm, and means resiliently engaging the worm to oppose movement thereof.

5. An adjustable wheel unit for use in registering and counting devices comprising two side by side sections, a series of annularly arranged teeth on one section, a worm engaging said teeth having an annular groove at one end and turning means at the other end, means in the second section forming a passageway for said worm and including a boss engaging said annular groove, said passageway being extended to the periphery of the section to expose the said turning means of the worm, and a spring in the second section engaging said one end of the worm and exerting a force on the worm axially thereof.

JAMES B. HOYE.

REFERENCES CITED

The following references are of record in the file of this patent:

UNITED STATES PATENTS

| Number | Name | Date |
|---|---|---|
| 919,590 | Katzung | Apr. 27, 1909 |
| 1,615,399 | Orth | Jan. 25, 1927 |
| 1,671,553 | Sheldrick | May 29, 1928 |
| 1,826,520 | McGowan | Oct. 6, 1931 |
| 1,888,533 | Jauch et al. | Nov. 22, 1932 |
| 2,040,025 | Slye | May 5, 1936 |
| 2,137,013 | Bradley | Nov. 15, 1938 |